May 26, 1959 H. H. JENNINGS 2,887,887
WASHING MACHINE TRANSMISSION
Filed April 2, 1956 3 Sheets-Sheet 1

INVENTOR.
HAROLD H. JENNINGS.
BY
ATTORNEYS.

INVENTOR.
HAROLD H. JENNINGS.
ATTORNEYS.

United States Patent Office 2,887,887
Patented May 26, 1959

2,887,887

WASHING MACHINE TRANSMISSION

Harold H. Jennings, Cincinnati, Ohio, assignor, by mesne assignments, to Philco Corporation, Philadelphia, Pa., a corporation of Pennsylvania Application April 2, 1956, Serial No. 575,506

2 Claims. (Cl. 74—77)

This invention relates to transmissions and, more specifically, to drive mechanism for selectively imparting oscillating or unidirectional rotary motion to a shaft from a single power source.

This invention has particular application in a drive for light machinery, such as domestic washing machines wherein it is desired to oscillate the clothes-containing tub for the washing operation and to spin the tub unidirectionally for extracting water from the clothes.

The preferred embodiment comprehends a rack and pinion mechanism for imparting oscillation to the driven shaft, a shifting means for disconnecting the oscillating mechanism from the driven shaft and engaging a spring clutch to connect the power source to impart unidirectional rotary motion to the driven shaft.

It is an object of this invention to provide a transmission mechanism wherein a single power source imparts oscillating motion to the driven shaft and provides a shifting means for discontinuing the oscillating motion and selectively engaging a self-tightening clutch for actuating meshed gears to drive the driven shaft in unidirectional rotary motion.

It is another object to provide a device where the unidirectional rotary driving gears are in mesh at all times.

It is another object to provide in a transmission mechanism an improved means for engaging a rotating gear system to rotate a shaft without the necessity of meshing gears.

It is another object to provide a transmission including a gear system which is adapted to engage without shock, drive without slip and release without sticking.

The novel features that I consider characteristic of my invention are set forth in the appended claims; the invention itself, however, both as to its organization and method of operation, together with additional objects and advantages thereof, will best be understood from the following description of specific embodiments when read in conjunction with the accompanying drawings in which:

Figure 1:
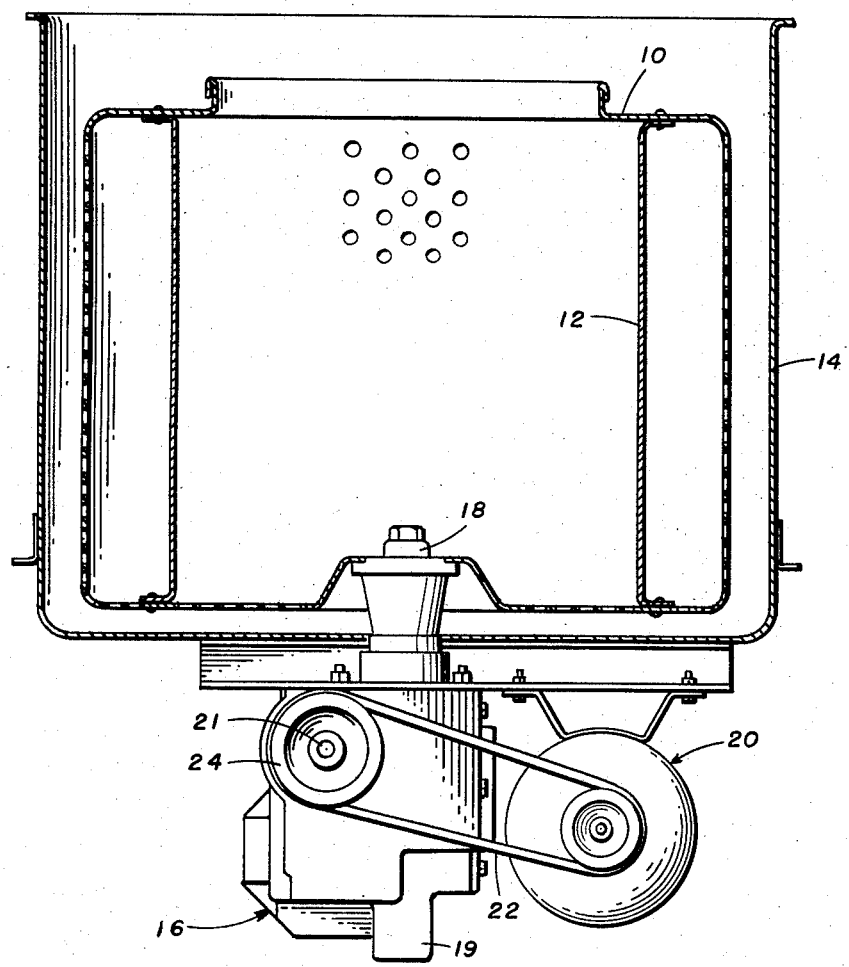
Fig. 1 is a side elevation, partially in section, showing portions of a washing machine drive mechanism embodying my invention.
Figure 2:
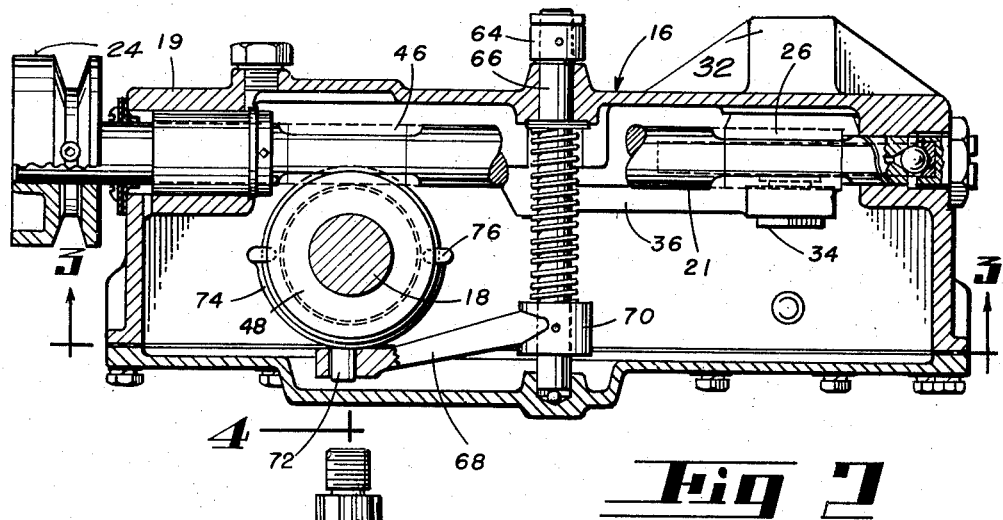
Fig. 2 is a plan view of the transmission with the top of the housing broken away, showing the arrangement of certain of the parts therein.
Figure 3:
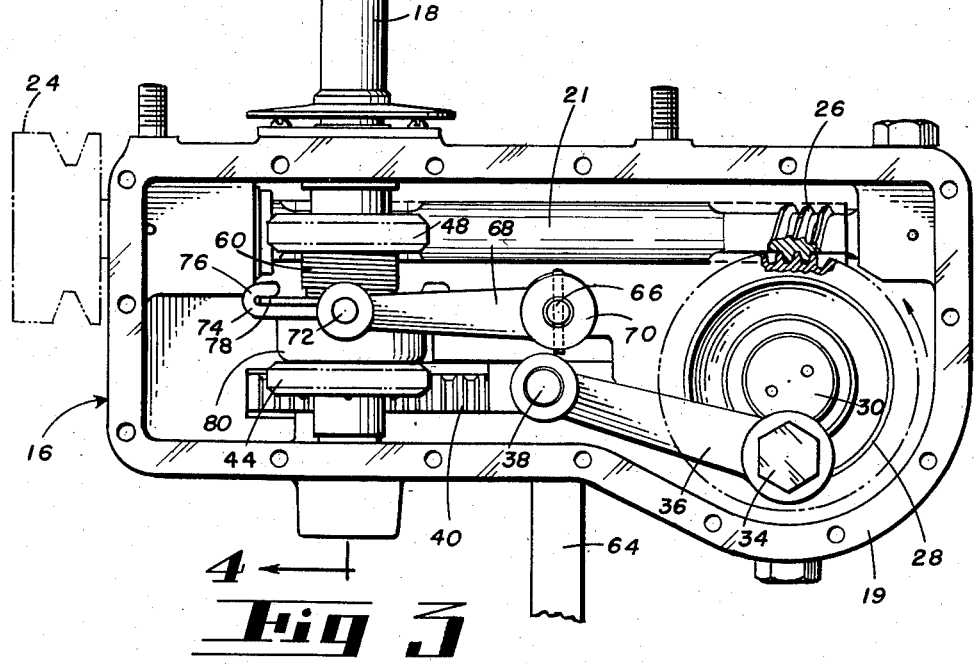
Fig. 3 is a side elevation of the transmission with the access cover removed, taken substantially along line 3—3 of Fig. 2.

Referring to Fig. 1 of the drawings, there is disclosed the invention as embodied in a washing machine which includes a clothes-washing tub 10 having clothes agitating baffles 12 secured thereto, contained within a suitable receptacle 14 for operation therein, a transmission 16, a vertical driven or output shaft 18 appropriately journaled in transmission housing 19 by means of which the tub is supported and operated, and an electric motor 20 having driving connection with the transmission through a belt 22. A horizontal driving or power shaft 21 journaled in the transmission housing 19 and having a pulley 24 fixed at its outer end is driven by motor 20 through belt 22. The cabinet and other supporting structure to complete the washing machine is omitted from Fig. 1.

According to this invention, two gear systems are provided in the transmission for selectively connecting the driving shaft 21 to the driven shaft 18 to impart to it either oscillatory or unidirectional rotary motion. Oscillatory or oscillating motion, as used in this specification, is meant to define alternate directional rotary motion for a part of a revolution in each direction, such as is commonly known in the art.

The oscillating mechanism consists of a worm 26 integral with driving shaft 21, which meshes with and drives worm wheel 28 rotatably mounted on shaft 30 secured to the transmission housing at 32. Worm wheel 28 upon its face carries stub shaft 34 offset from the axial center of the worm wheel, which stub pivotally supports one end of connecting rod 36. The other end of rod 36 is pivotally supported by a second stub shaft 38 carried by one end of gear rack 40, which is slidably journaled in the transmission housing at 42 adjacent driven shaft 18. Pinion 44 is slidably splined on shaft 18 and meshes with the gear teeth of rack 40. Thus, rotary motion of worm wheel 28 driven by worm 26 will cause rack 40 to reciprocate, whereby shaft 18 will be oscillated by virtue of splined pinion 44 being in meshing engagement with the rack.

The unidirectional rotating drive for the drive shaft 18 comprehends a second worm 46 integral with driving shaft 21 intermediate its ends for engaging with and driving a second worm wheel 48 freely rotatably mounted on shaft 18. Worm wheel 48 has an elongated hub 50 extending downwardly therefrom. Collar 52 splined to shaft 18 is positioned adjacent the lower end of the hub and has an outside diameter less than that of the hub. Collar 52 and worm wheel 48 are restrained from longitudinal movement on shaft 18 by thrust washers 54 and wafer washer 56 engaging retainer rings 58 secured in annular recesses of shaft 18. A spring clutch 60 is frictionally mounted on the periphery of hub 50 and is rotatable therewith. Said spring clutch has a portion surrounding collar 52 and not normally engaging its peripheral surface, because the free inside diameter of the spring is greater than the outside diameter of collar 52. Spring 60 terminates in an outturned radial projection 62. If the projection of the spring clutch is restrained with relation to rotation of the spring, the spring portion surrounding the collar will be wound tight upon its periphery in frictional engagement therewith, whereby the collar will be rotated with wheel 48. The means for restraining the spring projection will be hereinafter described.

There is provided a shifting means for selectively engaging the oscillating drive mechanism or the unidirectional rotating drive mechanism with the driven shaft 18 and tub 10, as well as providing a neutral position wherein neither drive mechanism is in engagement. This shifting means comprises a manually operated drive-selecting shift lever 64, which is fixed at its one end to shaft 66 pivotally journaled in transmission housing 19. Shifting arm 68 has one of its ends 70 fixed to shifting shaft 66 near its inner end for arcuate movement corresponding to the manual shifting of lever 64. The free end of arm 68 has journaled therein a stub shaft 72 of semicircular yoke 74. The open ends of yoke 74 are formed to provide upstanding, open end, inwardly-turned U-sections 76 which freely engage outwardly-extending radial flange 78 of shifting cup 80, which is fixed to pinion 44 by fasteners 82. The combination of shifting cup 80 and pinion 44 constitutes a shifting unit. Arcuate movement of arm 68 will impart linear movement to the shifting unit axially upon shaft 18. The peripheral wall of cup 80 has one or more inwardly-turned radial projections 84 so positioned vertically and of such length that they will arrest terminating projection 62 of spring member 60 when brought into vertical alignment therewith.

Operation of the device is as follows:

When motor 20 is energized, it will rotate shaft 21 by means of belt 22. Worm wheel 23 will be rotated by worm 26, which will cause rack 40 to be reciprocated by virtue of their interconnection by rod 36. Worm wheel 48 will also be rotated by worm 46.

Figure 4:
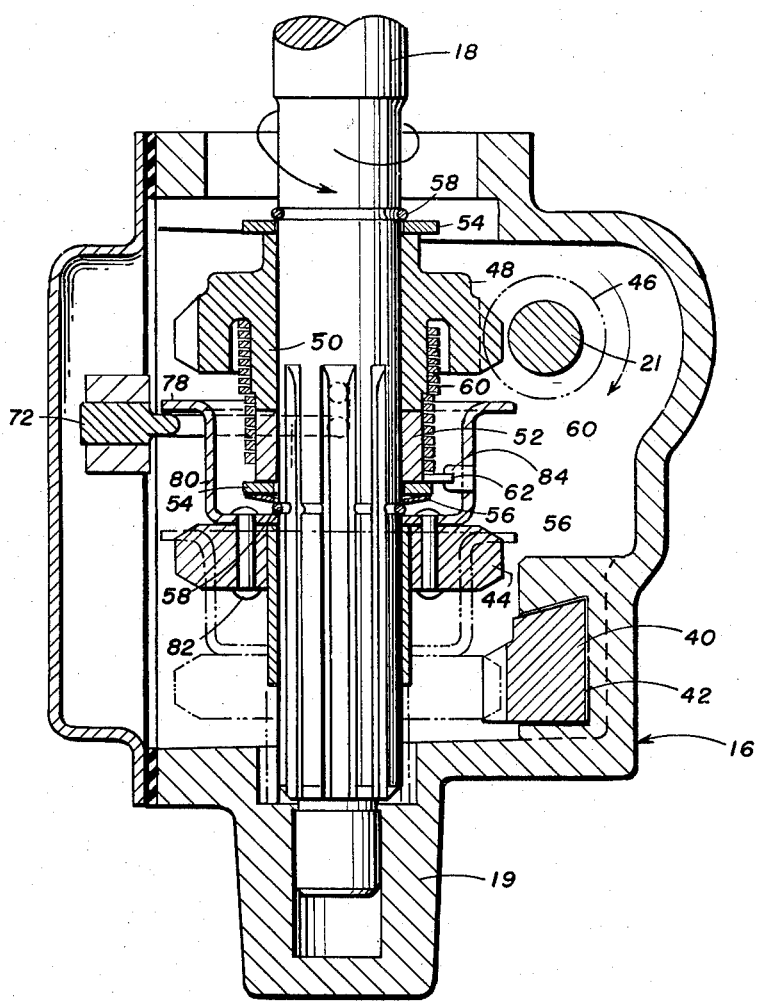
Fig. 4 is an enlarged cross-sectional view taken along line 4—4 of Fig. 3.

When it is desired to perform the washing operation, lever 64 is moved in a direction that will cause the shifting means to lower the shifting unit, which is slidably splined to shaft 18, into position wherein pinion 44 will engage with the reciprocating rack 40, illustrated by broken lines in Fig. 4, whereby shaft 18 will oscillate, carrying tub 10 supported thereon with it to produce a well known oscillating washing action.

Upon completion of the washing cycle, if it is desired to extract the water contained in the clothes, lever 64 is moved in a direction that will cause the shifting means to raise the shifting unit and disengage pinion 44 from reciprocating rack 40, stopping the oscillating motion. Further movement of the lever will move the shifting unit through the neutral position into the unidirectional rotating drive position, as illustrated by the solid lines in Fig. 4, in which projection 84 of shifting cup 80 will arrest terminating projection 62 of spring clutch 60, causing the spring to wind tight upon the periphery of collar 52 in frictional drive, whereby freely rotating worm wheel 48 will drive shaft 18 through the collar which is in splined connection to the shaft. This will impart unidirectional rotation to the tub and cause the water in the clothes to be thrown out through holes in the periphery of the tub under centrifugal force.

If it is desired to stop the motion of the tub for the removal or insertion of clothes, the shifting lever is moved to the neutral position, wherein the shifting unit is between the unidirectional driving position and the oscillating position. This will forestall the necessity of de-energizing the power source during this short interval of time.

The various features and advantages of the design and construction disclosed are thought to be clear from the foregoing description. Various other features and advantages not specifically enumerated will undoubtedly occur to those versed in the art, as likewise will many variations and modifications of the preferred embodiment of the invention illustrated, all of which may be achieved without departing from the spirit and scope of the invention.

I claim:

1. In combination with a rotatably mounted output shaft, a power transmission comprising a rotating drive member, a reciprocating drive member, an idler gear and a pinion gear mounted concentrically and spaced from each other on the output shaft, said idler gear being enmeshed with said rotating drive member and rotatable on said shaft, said pinion gear being drivingly connected to said shaft and mounted to slide longitudinally thereof, a collar receiver on and drivingly connected to said shaft between said gears, a coil spring in engagement with said idler gear to rotate therewith and having a portion which freely surrounds said collar, abutment means associated with said spring portion, a stop element carried by said pinion gear, and means for sliding said pinion gear for placement thereof in one position wherein said stop engages said abutment means and tightens said spring portion about said collar thereby establishing a unidirectional rotary drive connection between said rotating drive member and said output shaft, and for sliding said pinion gear for placement thereof in another position wherein said pinion gear engages said reciprocating drive member thereby establishing an oscillating rotary drive connection between said reciprocating drive member and said output shaft.

2. A power transmission as set forth in claim 1, in which the mentioned idler gear is provided with a hub having a diameter greater than the diameter of the mentioned sleeve, and the mentioned spring is fitted over and frictionally engages said hub.

References Cited in the file of this patent

UNITED STATES PATENTS

| Re. 21,020 | Wales | Feb. 28, 1939 |
| 1,969,176 | Kirby | Aug. 7, 1934 |
| 1,970,716 | Thompson | Aug. 21, 1934 |
| 2,200,870 | Armbruster | May 14, 1940 |
| 2,369,905 | Page | Feb. 20, 1945 |
| 2,499,473 | Elder | Mar. 7, 1950 |
| 2,551,739 | Harlan | May 8, 1951 |